United States Patent [19]
Johnson

[11] 3,905,725
[45] Sept. 16, 1975

[54] PUMP APPARATUS

[75] Inventor: Roger L. Johnson, Wayzata, Minn.

[73] Assignee: VEDA, Inc., Long Lake, Minn.

[22] Filed: July 17, 1974

[21] Appl. No.: 489,259

[52] U.S. Cl. .................. 417/231; 259/96; 415/148; 415/219 C; 417/234; 417/440
[51] Int. Cl.² .......................................... F04B 35/06
[58] Field of Search ........... 417/231, 234, 440, 206; 415/148, 219 C, 196; 259/96

[56] References Cited
UNITED STATES PATENTS

| | | | |
|---|---|---|---|
| 2,664,052 | 12/1953 | Schmidt............................... | 417/234 |
| 2,698,583 | 1/1955 | House et al......................... | 417/231 |
| 3,008,422 | 11/1961 | Crisatulli............................. | 417/234 |
| 3,155,046 | 11/1964 | Vaughan.............................. | 415/206 |
| 3,423,075 | 1/1969 | Knudsen et al...................... | 259/96 |

FOREIGN PATENTS OR APPLICATIONS

| | | | |
|---|---|---|---|
| 96,293 | 10/1922 | Switzerland......................... | 415/196 |
| 486,574 | 11/1929 | Germany............................. | 415/219 R |
| 107,933 | 4/1925 | Switzerland......................... | 415/149 A |

*Primary Examiner*—Charles J. Myhre
*Assistant Examiner*—David D. Reynolds

[57] ABSTRACT

A machine for pumping material, as animal manure, from a pit to a tank spreader. The machine has a power driven impeller operable to move material through a fill pipe and an agitator pipe. A fill valve is operable to close the fill pipe so that all the material discharged by the impeller goes through the agitator pipe to mix the material in the pit. An agitator valve is operable to close the agitator pipe so that the material is pumped through the fill pipe. The fill and agitator valves have cooperating controls which prevent both valves from being closed at the same time. The fill pipe and impeller are movably carried on a transport assembly. A cable and drum winch positively controls the position of the fill pipe and impeller relative to the transport assembly.

23 Claims, 11 Drawing Figures

PATENTED SEP 16 1975 3,905,725
SHEET 4 OF 6
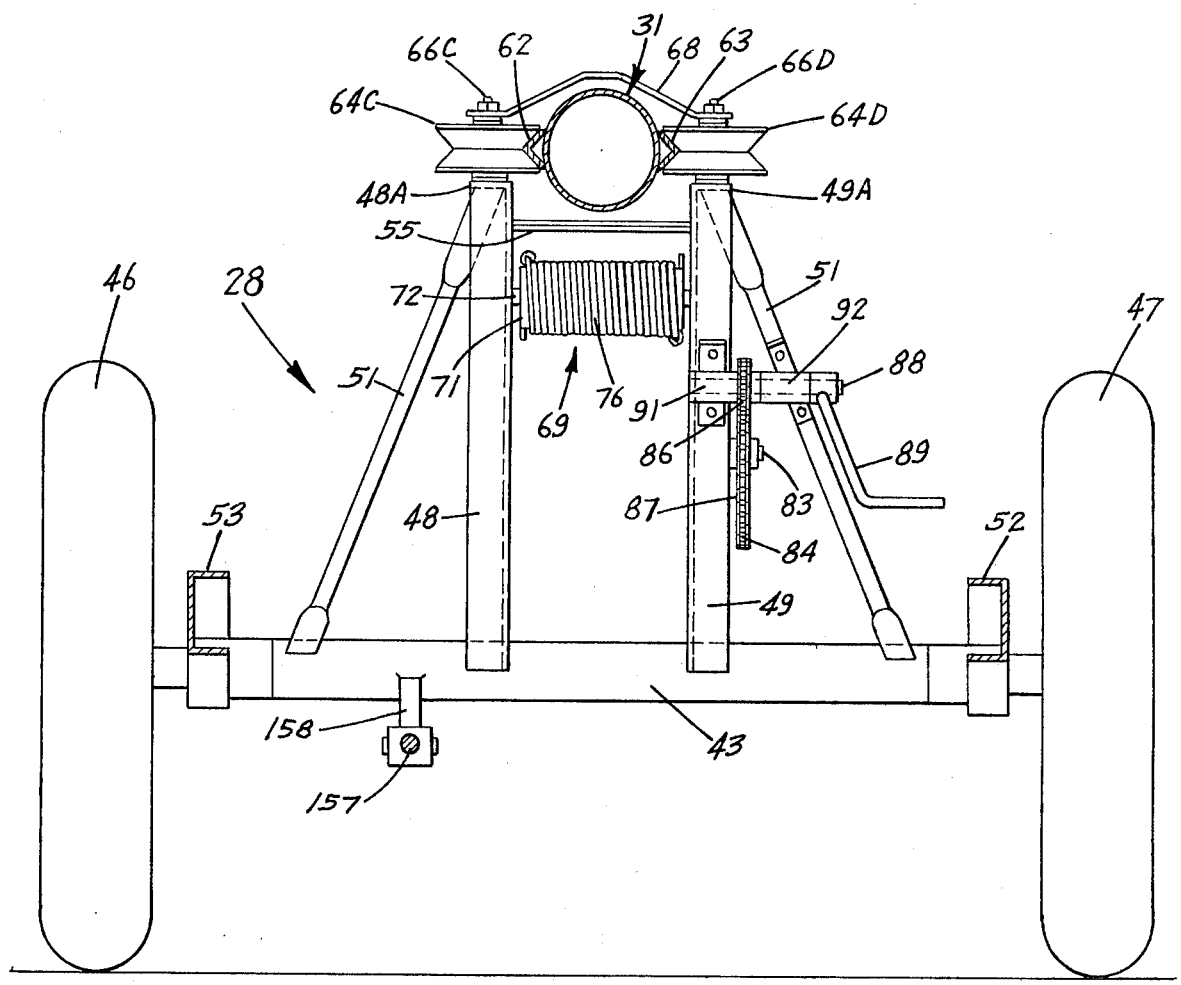
Fig_4
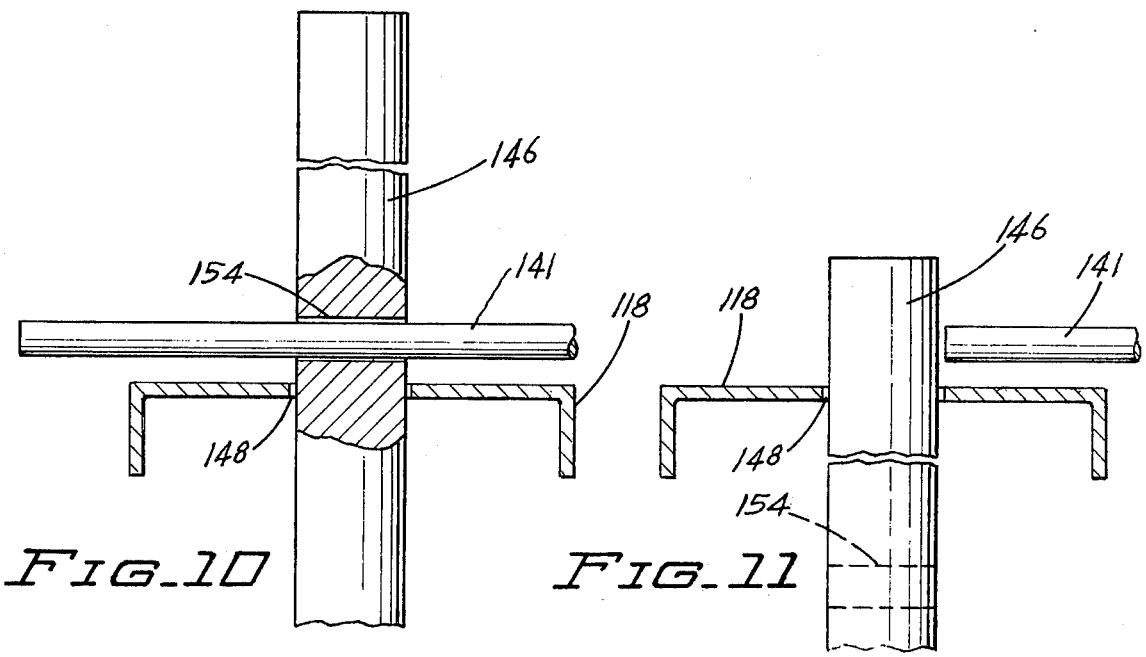
Fig_10    Fig_11

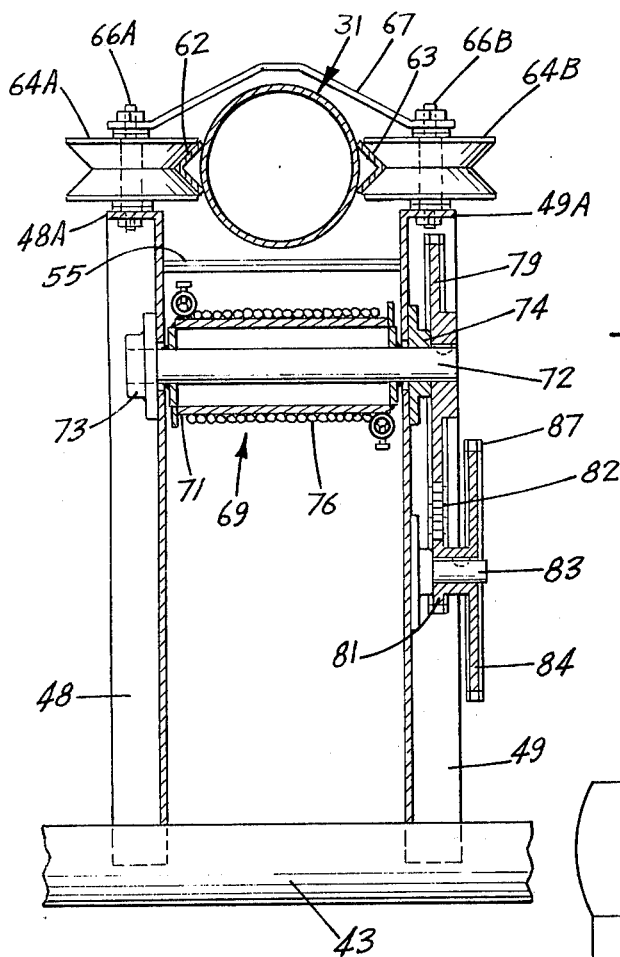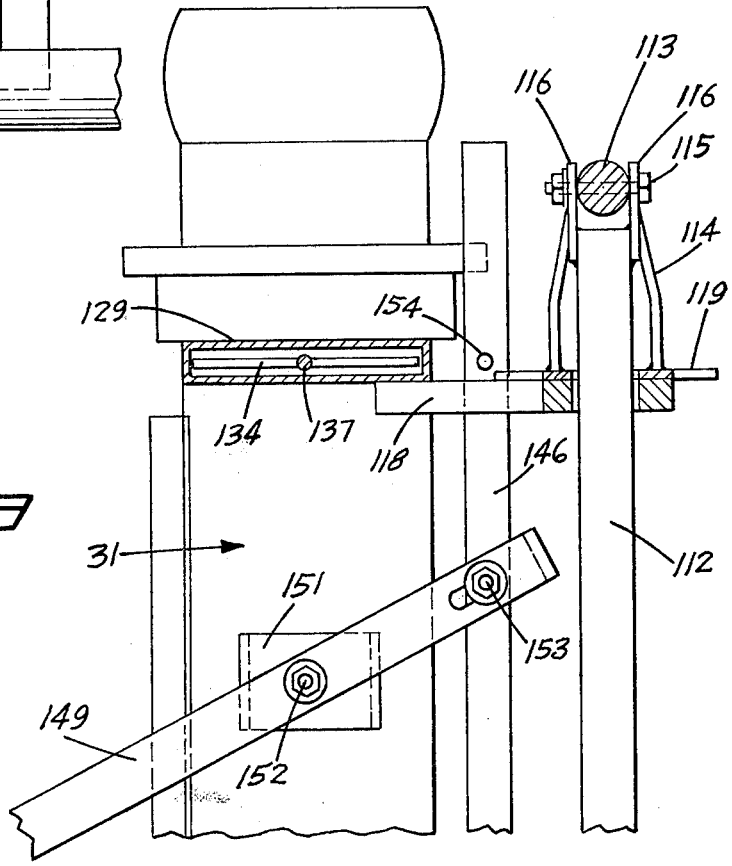

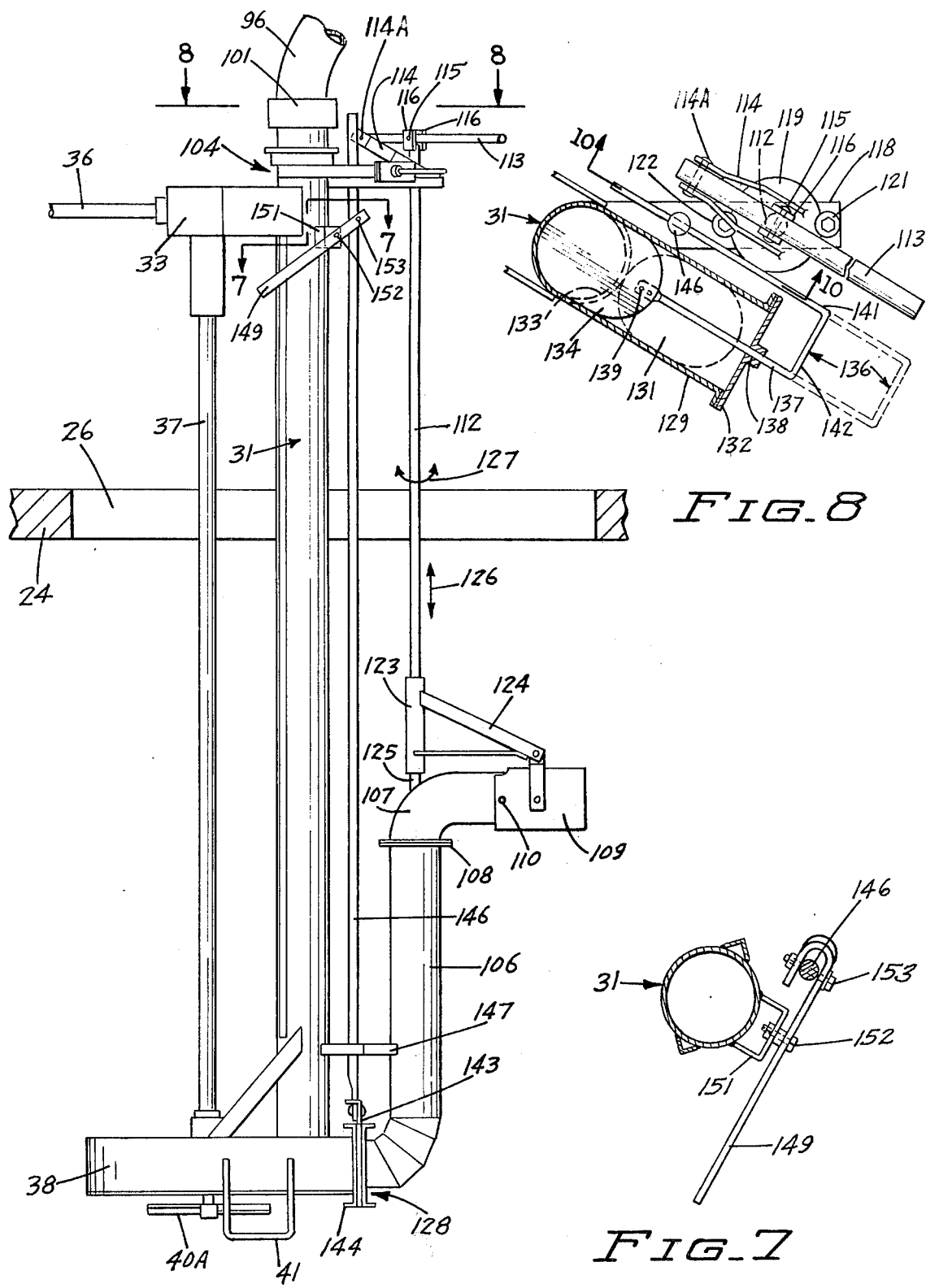

PUMP APPARATUS

BACKGROUND OF THE INVENTION

Animal wastes should not be applied to farm land under adverse soil or weather conditions except when planned methods will insure that they will remain on the land. The wastes should be stored in designed structures, as reservoirs, tanks, pits and the like, until they can be incorporated into the soil. The manure handling system should be designed to meet legal and market requirements, save the maximum amount of fertility of the manure, utilize labor efficiently, keep production costs down, and overcome objectional side effects including the control of flies, insuring safe water supplies and protecting products such as milk from absorbing manure odors.

Run-off control is a basic part of a manure handling system. It is an acute problem where livestock yard run-off could pollute streams, lakes or ground water. Structures such as pits, diversions and storage or detention reservoirs have been used to check run-off problems present in manure handling systems.

The conventional manure pit is from 8–12 feet deep and has a round, square or rectangular shape. The pit may be of a size to store a 150–180 day manure accumulation so that the manure can be spread at an advantageous and convenient time. Machines known as agitator pumps and agitator loaders are used to pump the manure from the pits into tank spreaders. These machines use an impeller driven by a tractor to pump the manure through a pipe structure into the tank spreader. An example of this type of pump is disclosed by Vaughan in U.S. Pat. No. 3,155,046. The machines have agitator outlets used to mix the manure in the pit so that it is in a slurry condition. The machines have separate valves to control the movement of the manure from the impeller to the fill pipe or agitator pipe. The valves are separately operated so that both valves can be opened or simultaneously closed. When both valves are closed, the operation of the impeller may destroy the impeller and impeller housing structure as both outlets for the manure are blocked. The machines employ frame or transport structures with a support structure on which the fill pipe and impeller are movably mounted. The support structure is pivotable so the fill pipe is disposed in a generally horizontal position for transport and in a generally vertical position for pumping. A lifting mechanism, such as a rack and gear, is used to move the impeller with respect to the support structure to raise and lower the impeller in the pit. These structures have been found to be unreliable in raising and lowering the impeller and in controlling its location in the pit. The fill pipe is a long tubular member attached at its inlet end to the impeller housing. It must be raised to substantially its uppermost position and then pivoted with its support structure when being removed from a pit and into the transport position. This results in great stress on the support structure and the fill pipe and may result in deflection of the support structure and the fill pipe so that the pipe and impeller cannot be moved on the support structure.

Another type of pumping system utilizing a pump and tank is shown in U.S. Pat. No. 2,596,151. This pump is operable to remove mud and sludge from sumps. An agitator connected to a discharge of the pump is used to agitate the material in the sump so that it can be withdrawn by the pump and discharged into a tank.

SUMMARY OF THE INVENTION

The invention is directed to a pumping apparatus operable to remove material, as liquids, semi-solids and solids suspended and carried by liquids, from a storage area into a transport container, such as a tank spreader. More particularly, the invention is directed to an agitator-pump apparatus for removing manure from a pit and discharging the manure into a tank spreader or similar transport container. The pumping apparatus has a pumping unit having a first discharge or fill pipe for carrying the material from the storage area to a desired location. The pumping unit has a second discharge or agitator pipe for discharging material in the material storage area to agitate and mix the material in the storage area. A first valve is operable to selectively open and close the first pipe. A second valve is operable to selectively open and close a second pipe. The first and second valves have control means which cooperate with each other so that the first valve and second valve cannot be simultaneously closed. The pumping unit is mounted on a transport vehicle. Carriage structure connects the vehicle with the first pipe. A lifting and lowering mechanism cooperates with the carriage structure to provide for positive lifting and lowering of the pumping unit into a pit.

An object of the invention is to provide a material pumping apparatus with two material discharge outlets and valves for both outlets which always permit movement of material through one of the outlets. A further object of the invention is to provide a material pumping apparatus with a carriage and positioning structure which is easily operated to place the impeller structure of the pump in a material storage area and positively control the position of the pumping unit in the storage area. Another object of the invention is to provide a material pumping machine which is portable so it can be used in several material storage areas having different sizes and shapes. Another object of the invention is to provide a material pumping apparatus which can handle liquids, semi-solids and solids suspended in or mixed with liquids and is operable to mix solids with liquids so they an be readily pumped from a storage area to a desired location. Yet another object of the invention is to provide support structure for an elongated fill pipe and impeller which reinforces the fill pipe and permits positive movement and control of the location of the impeller in a pit.

IN THE DRAWINGS

FIG. 4 is an enlarged sectional view taken along line 4—4 of FIG. 3;

FIG. 5 is an enlarged sectional view taken along line 5—5 of FIG. 2;

FIG. 6 is a side elevational view of the pump apparatus in its upright or pumping position;

FIG. 7 is an enlarged sectional view taken along the line 7—7 of FIG. 6;

FIG. 8 is a top plan view taken along line 8—8 of FIG. 6 with the fill valve shown in section;

FIG. 9 is an enlarged side elevational view of the interlocking control for the fill and agitator valves;

FIG. 10 is an enlarged sectional view taken along line 10—10 of FIG. 8 showing the control locking the agitator valve in the open position with the fill valve in the closed position; and FIG. 11 is a sectional view similar to FIG. 10 showing the control locking the fill valve in the open position with the agitator valve in the closed position.

DESCRIPTION OF PREFERRED EMBODIMENTS

Figure 1:
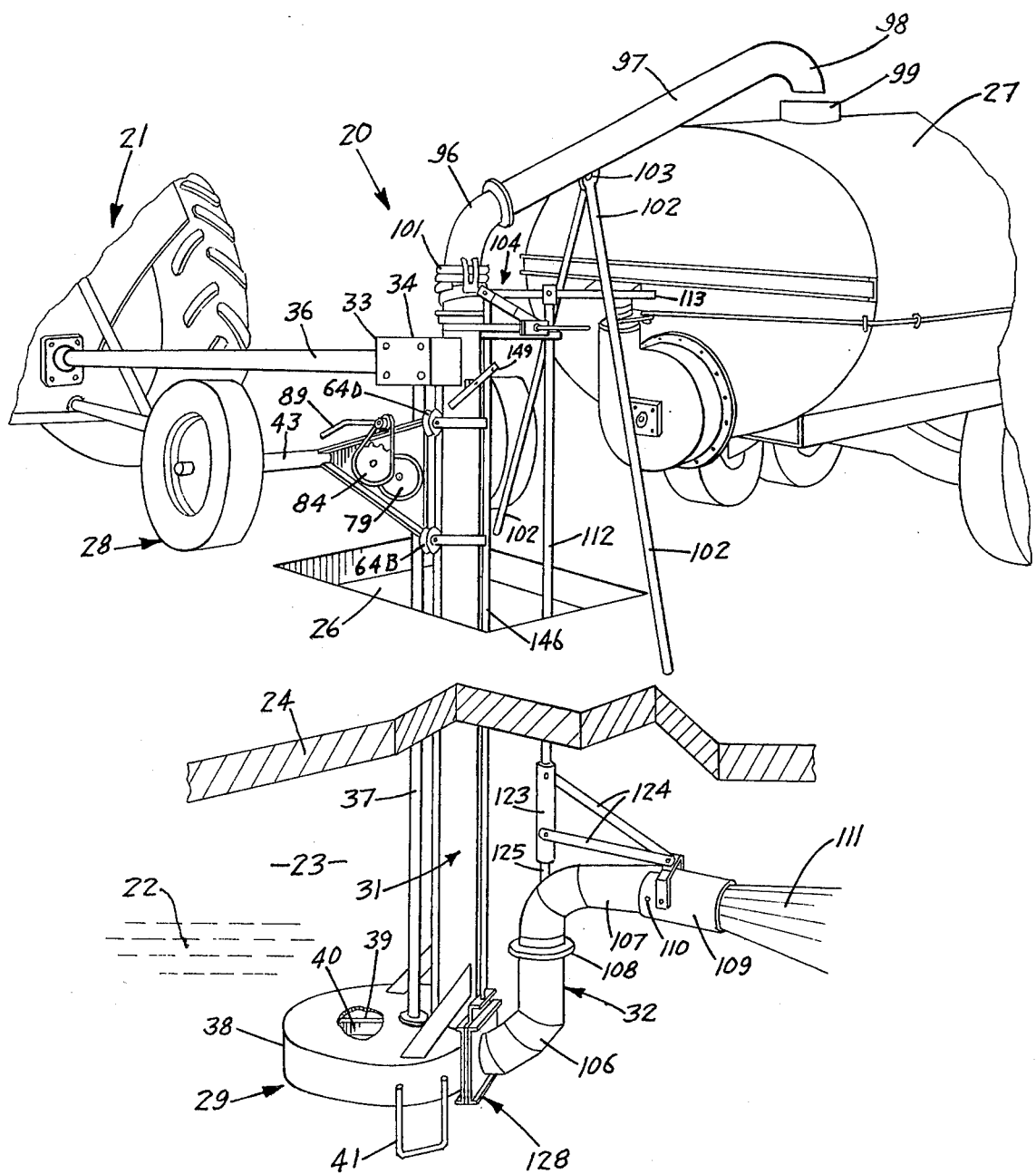
FIG. 1 is a perspective view of the pumping apparatus of the invention located in operative relation in a material storing pit for pumping the material from the pit into a tank spreader.

Referring to the drawing, there is shown in FIG. 1 a pump apparatus indicated generally at 20 operated by a tractor 21 to remove manure or similar material 22 from a pit or storage chamber 23. Pump apparatus 20 is supported on a top wall 24 of the pit and extends through an opening 26 in the wall 24. The upper end of pump apparatus 20 is located adjacent a tank 27 of a liquid manure spreader. The liquid manure spreader can be the type disclosed in U.S. patent application Ser. No. 435,843 filed Jan. 23, 1974.

Pump apparatus 20 has a transport vehicle or truck indicated generally at 28 and an impeller indicated generally at 29. A first discharge or fill pipe 31 extends from impeller 29 upwardly through hole 26. The impeller 29 and fill pipe 31 are movably mounted on transport vehicle 28 so that the elevation of impeller 29 can be changed and the impeller 29 and fill pipe 31 can be raised from and lowered into the pit.

A second discharge pipe 32 is connected to impeller 29 to agitate the material in the pit 23.

Figure 2:
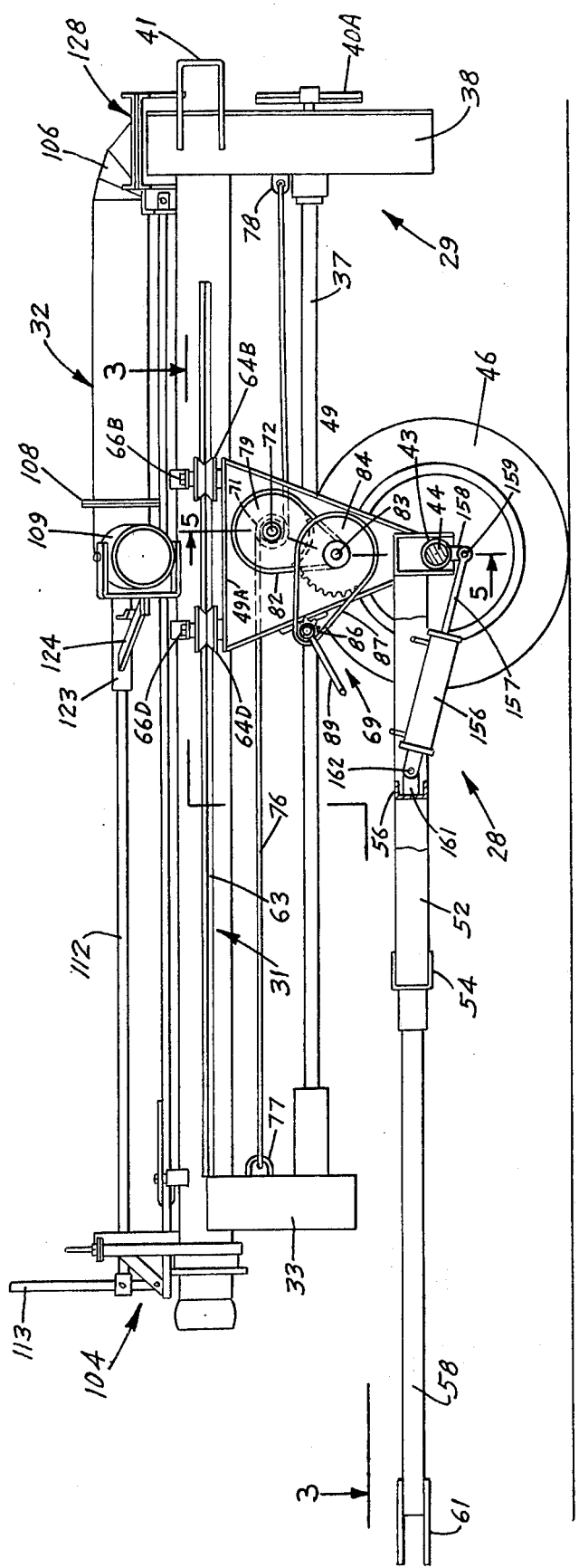
FIG. 2 is a side elevational view of the pump apparatus in the transport position.

The drive system for the impeller 29 is a mechanical drive from tractor 21. A bracket 33 is secured to the upper end of the first discharge pipe 31. A gear box or power transmission 34 is attached to the bracket 33. A generally horizontal power takeoff shaft 36 is connected to the gear box and power takeoff shaft of tractor 21 with conventional universal joints (not shown). A generally vertical drive shaft 37 is connected to gear box 34 and impeller 29. Impeller 29 has a generally circular housing 38 movably carrying a rotor 39. Rotor 39 has a plurality of radially extended paddles 40 which are driven in a circular direction upon rotation of shaft 37. The bottom of housing 38 has an inlet opening (not shown) for material 22. As shown in FIGS. 2 and 6, a horizontal blade 40A located below the inlet opening of housing 38 is secured to rotor 39. Secured to one side of housing 38 is a downwardly extended U-shaped leg 41 which serves as a stop to hold the housing 38 and blade 40A off the floor or bottom of pit 23.

Figure 3:
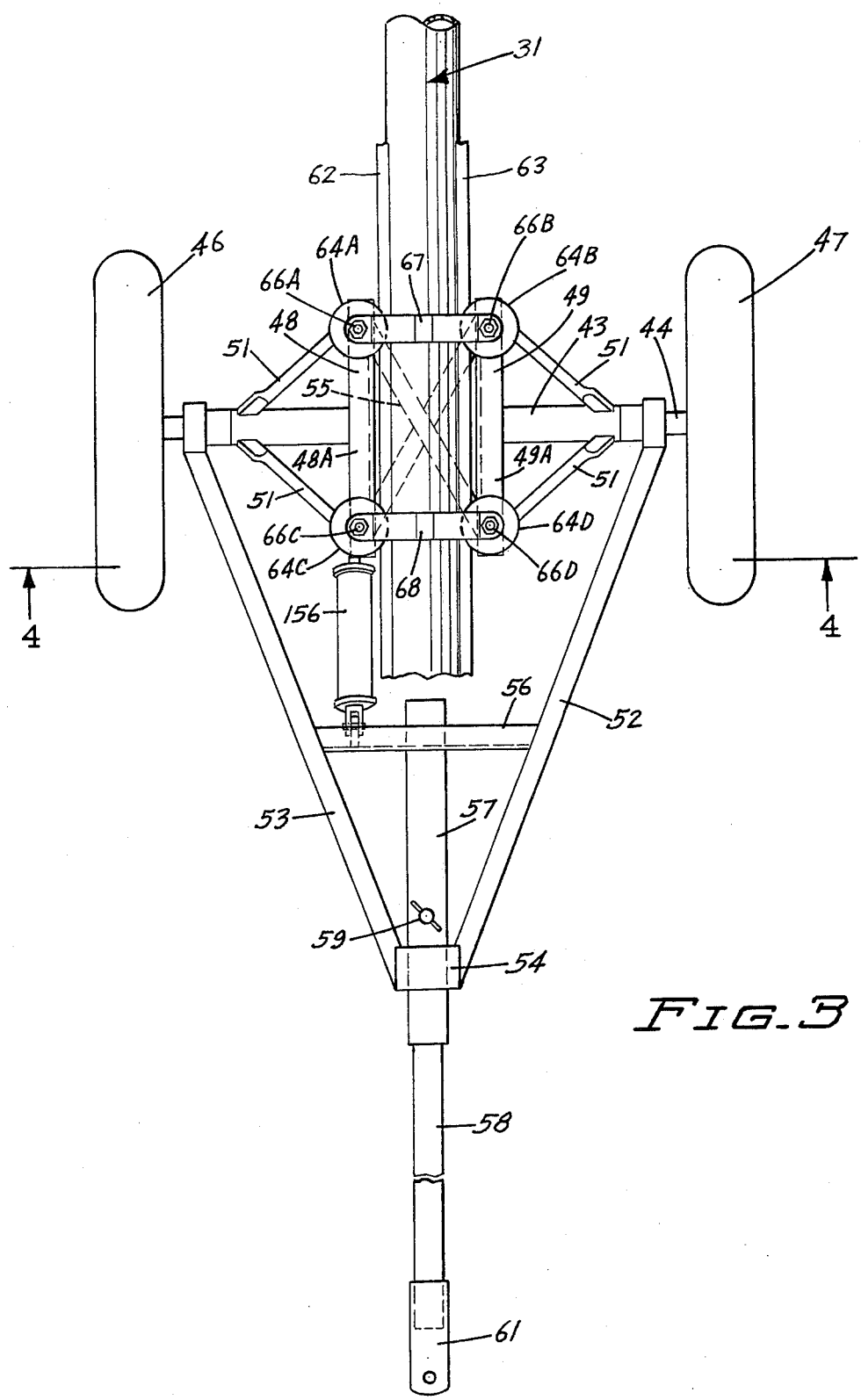
FIG. 3 is a foreshortened sectional view taken along line 3—3 of FIG. 2.

Referring to FIGS. 2 and 3, transport 28 has a transverse tubular support 43. An axle 44 is rotatably mounted in support 43. Wheels 46 and 47 are mounted on opposite ends of axle 44. Secured to the midsection of support 43 are upright triangular plates 48 and 49. The apex portions of plates 48 and 49 are secured to support 43 by welds or the like. Upright braces 51 are secured to the corners of the plates 48 and 49 and outer portions of the support 43. The triangular plates 48 and 49 are located adjacent opposite sides of the first discharge pipe 31.

Rotatably connected to the opposite outer ends of support 43 are forwardly converging side members 52 and 53. The forward ends of members 52 and 53 are secured to a collar 54. A cross member 56 extends between the midportions of members 52 and 53 and are secured thereto. A longitudinal tube 57 is mounted in collar 54 and is secured to cross member 56. A longitudinal tongue 58 is slideably mounted in tube 57. Tongue 58 has a plurality of upright holes (not shown) for accommodating a locking pin 59 whereby the length of tongue 58 can be adjusted. A hitch 61, as a clevis or bifurcated plates having vertically aligned holes, is secured to the forward end of tongue 58 whereby the tongue can be conveniently attached with a pin to a draw bar of a tractor.

First discharge pipe 31 is movably mounted on the triangular plates 48 and 49 so that the impeller 29 can be vertically positioned in pit 23. A pair of tracks or right angle or V-rails 62 and 63 are secured to opposite sides of the discharge pipe 31. Rails 62 and 63 are right angle members which extend longitudinally along diametrically opposite sides of the discharge pipe 31. The opposite flanges of the right angle or V-rails 62 and 63 are secured by welds to the side of fill pipe 31 to reinforce the fill pipe and provide guides for the fill pipe. As shown in FIG. 2, rails 62 and 63 ride on four rollers 64A, 64B, 64C and 64D whereby the pipe 31 is longitudinally guided by rollers 64A–64D. Roller 64A is rotatably mounted on an upright axle or pin 66A secured to the rear portion of flange 48A of plate 48. Roller 64C is rotatably mounted on an axle 66C secured to the forward edge of flange 48A. Rollers 64A and 64C each have V-grooves to accommodate the right angle rail 62 so that rail 62 rides on these rollers. In a similar manner, rollers 64B and 64D are rotatably mounted on axles or pins 66B and 66D. Rollers 64B and 64D each have V-grooves to accommodate right angle rail 63 whereby rail 63 rides on rollers 64B and 64D. A cross member or strap 67 extends over the top of pipe 31 and is secured to the outer ends of axles 66A and 66B. In a similar manner, a second strap 68 extends over pipe 31 and is mounted on the upper ends of axles 66C and 66D. Rails 62 and 63 riding on rollers 64A–64D permit longitudinal movement of fill pipe 31 relative to transport vehicle 28 and prevent twisting and flexing of fill pipe 31. These rollers 64A–64D and plates 48 and 49 take the reaction torque of the power applied to the impeller. The relatively heavy impeller 38, being mounted on the lower or inlet end of fill pipe 31, is not balanced on rollers 64A–64D. The V-grooved rollers act on rail 62 and 63 to compensate for the unbalanced condition of fill pipe 31 and impeller 38.

Referring to FIGS. 2 and 4, there is shown a position control means or lifting and lowering mechanism indicated generally at 69 for moving the fill pipe 31, impeller 38 and agitator pipe 32 relative to the transport vehicle 28. The position control means 69 comprises a transverse drum 71 located between the plates 48 and 49. Drum 71 is secured to shaft 72. Bearing 73 mounts shaft 72 on plate 48. In a similar manner, bearing 74 mounts shaft 72 on plate 49. A cable 76 is wound around and secured to drum 71. Cable 76 has one end secured to an anchor or bracket 77 attached to bracket 33 holding the gear box at the upper end of the first discharge pipe 31. The lower or opposite end of cable 76 is attached to drum 71. Another cable attached to the opposite end of drum 71 is attached to an anchor or bracket 78. Bracket 78 is secured to the top wall of impeller housing 38. Cable 76 can be a single cable or two cables wound on drum 71.

Drum 71 is rotated with a drive system shown in FIG. 2. The drive system is a gear and sprocket arrangement comprising a first gear 79 mounted on the end of shaft 72 projected from bearing 74. A second gear 81 is drivably connected with the first gear 79 by an endless chain 82. Second gear 81 is rotatably mounted on a fixed jack shaft attached to plate 49. A third gear or sprocket 84 is drivably connected to the second gear. A drive gear is coupled to gear 84 with an endless chain 87. Drive gear 86 is mounted on a shaft 88. A crank handle 89 is fixed to the outer end of shaft 88. As shown in FIG. 4, shaft 88 is rotatably mounted in bearing 91 secured to a portion of plate 49.

In use, the crank handle 89 is rotated in one direction to turn drum 71 to raise the impeller 29 in an upward direction toward truck 28. Rotation of the crank handle 89 in the opposite direction will move the impeller 29 in a downward direction or away from truck 28. The movement of impeller 29 in either direction is a positive movement established by a pulling force on one of the ends of cables 76. Impeller 29 and discharge pipes 31 and 32 ride on rollers 64A, 64B, 64C and 64D. The rollers are in operative engagement with side rails 62 and 63 shown in FIG. 4, whereby the pipe 31 is longitudinally guided by the rollers 64A–64D.

Referring to FIGS. 1 and 5, the discharge pipe 31 extends in an upward direction and is connected at its top end to an elbow pipe 96. An upwardly inclined out pipe 97 is secured to elbow pipe 96. Out pipe 97 has a downwardly open nozzle 98 to direct the material into the fill hole 99 of the tank spreader 27. A circumferentially movable coupling connector 101 joins the elbow pipe 96 to the top end of pipe 31. Coupling connector 101 permits angular movement or rotation of elbow pipe and out pipe so that the nozzle can be aligned with the fill hole 99. A pair of downwardly divergent legs 102 support the out pipe 97. The top ends of legs 102 are connected to pipe 97 with pivot member or pin 103. Pivot member 103 extends through a bracket or tab (not shown) secured to the bottom of pipe 97. A first or fill valve indicated generally at 104 is mounted in the upper end of fill pipe 31 to control the flow of material through the pipe. Fill valve 104 is movable to an open position to permit flow through fill pipe 31 and out pipe 97. Alternatively, valve 104 can be closed to prevent the flow of material through fill pipe 31.

The second discharge pipe or agitator pipe 32 has a first elbow 106 connected to a second elbow 107 with a connector joint 108. Joint 108 permits the second elbow 107 to be rotated about a generally upright axis. The outer end of elbow 107 is open and carries a discharge chute or generally tubular or round member 109. Pivots 110 connect the chute 109 to the end portion of second elbow 107. The discharge chute 109 is used to change the vertical direction of the stream of material 111 discharged from the second elbow 107.

A manually operated control rod 112 is used to control the circumferential position of the second elbow 107 and the position of discharge chute 109. Control rod 112 is secured to an outwardly directed handle 113. As shown in FIGS. 6 and 9, handle 113 is secured at one end to an upwardly directed bracket 114. A pivot 114A pivotally secures handle 113 to the bracket. A second pivot pin 115 attached the control rod 112 to the handle 113. A pair of upwardly directed ears 116 are attached to the upper end of rod 112. Handle 113 is located between the ears. Pivot pin 115 extends through aligned holes in the ears and handle and thereby pivotally connect the handle to the ears. The rod 112 extends upwardly through a hole in a support. The support is a channel-shaped member secured to the upper end of fill pipe 31.

A disc 119 is located on top of support 118. The lower ends of bracket 114 are secured to the disc. Disc 119 has a center hole permitting the rod 112 to rotate and move longitudinally relative to the disc. The disc is rotatably retained on support 118 with a pair of rollers 121 and 122. The rollers are mounted on fixed axles or studs secured to the support 118. Rollers 121 and 122 have radial flanges which extend over a top portion of the disc and thereby hold the disc in rotating assembled relation with the support 118. The lower end of rod 112 is connected to sleeve 123 carrying outwardly directed arms 124. Sleeve 123 is movably positioned on a fixed upright axle 125 whereby sleeve 123 and rod 112 can move up and down in the direction of arrow 126 on up and down movement of handle 113. This moves the discharge chute 109 about the transverse axes of pins 110 to change the up and down direction of the material stream 111. Handle 113 can be rotated to twist the rod 112 in a circular direction, as indicated by arrow 127. This moves the second discharge elbow 107 circumferentially whereby the material stream 111 can be angularly moved. This enables all areas of the pit to be agitated and circulated.

A second valve indicated generally at 128 is connected between the impeller 38 and first agitator elbow 106. Valve 128 is operable to selectively open and close the passage from the impeller housing to the elbow 106.

Referring to FIG. 6, the first valve 104 has a generally flat, rectangular housing 129 having an elongated chamber 131. The chamber is closed with end plate 132 secured to housing 129. The housing 129 has vertically aligned hole 133 in communication with the passage through fill pipe 131. The housing 129 is secured to fill pipe 131 in a manner whereby hole 133 is in axial alignment with passage of fill pipe 31. A generally flat valving member or gate 134 is movably positioned in chamber 131. Gate 134 is moved to a first position shown in full lines, to prevent or stop the flow of material through hole 133 and movable to a second position, shown in broken lines, to permit flow of material through the hole 133. A generally U-shaped actuator rod indicated generally at 136 is used to control the positions of the gate 134. Actuator rod 136 has a first linear member or leg 137 slidably positioned through hole 138 in end plate 132. A pair of fasteners, as bolts, rivets or the like, attach the leg 137 to gate 134. Rod 136 has a second linear member or leg 141 located outside of housing 129 and generally parallel to leg 137. A back 142 connects the outer ends of the legs. Back 142 serves as a convenient handle in the operation of the valve gate 134.

The second valve 128 has a movable valving member or gate 143 arranged in a housing 144. Housing 144 is secured to the impeller 138 and the inlet end of the first agitator elbow 106. Gate 143 is connected to an upright rod 146. Rod 146 extends through a cross brace 147 connecting the fill pipe and agitator elbow 106. The upper end of rod 146 extends through hole 148 (FIGS. 10 and 11) in support 118. Rod 146 is movable up and down to open and close valve 128. A lever 149 (FIG. 9) is pivotally mounted to bracket 151 with a pin or bolt 152. Bracket 151 is secured to the upper end of fill pipe 131. The lever 149 has a hooked end located about rod 146. A pin 153 pivotally connects the lever 149 to the rod 146.

As shown in FIGS. 8, 10 and 11, the upper end of rod 146 has a hole 154 accommodating the actuator leg 141 when the valve gate 134 is in the closed position. Hole 154 is located in rod 146 and aligned with leg 141 when the second valve 128 is open. The second valve 128 cannot be closed unless actuator 136 for the first valve 104 is open. When the second valve 128 is closed, hole 154 is not in alignment with leg 141. The upper portion of rod 146 is located in the path of movement of leg 141. This prevents actuator 136 from moving in and closing valve 104. In other words, when valve 128 is closed, valve 104 cannot be closed. Thus, during operation of the pumping apparatus, the material discharged by impeller 38 is either moving through fill pipe 31 or agitator pipes 106 and 107. Both exits of impeller 38 cannot be simultaneously closed.

The transport vehicle 28 includes a hydraulic cylinder 156 shown in FIGS. 2 and 3 for controlling the position of the pumping apparatus. As shown in FIG. 2, the pumping apparatus is located in the horizontal or transport position. The hydraulic cylinder 156 has a piston rod 157 connected to a downwardly directed arm 158 with a pivot pin 159. Arm 158 is attached to the transverse tubular support 43 carrying the plates 48 and 49. The forward end of hydraulic cylinder 156 is connected to arm 161 secured to cross member 56. A pin 162 pivotally connects hydraulic cylinder 156 to arm 161. Hydraulic cylinder 156 is a double acting cylinder having suitable hydraulic lines connected to a hydraulic power source, such as the hydraulic power source of the tractor. When the hydraulic cylinder 56 is contracted, the fill pipe 31 moves from the generally horizontal position shown in FIG. 2 to the vertical position shown in FIG. 1. When the impeller 38 is located over the hole for the material pit, position control means 69 is actuated to positively move the impeller 38 down into the pit to the desired distance.

In use, the power takeoff shaft 36 is connected to gear box 34 and power takeoff of the tractor. The application of power to power takeoff shaft 36 drives shaft 37 and rotates rotor portion 40 of impeller 39. This also rotates blade 40A secured to the bottom of rotor 39. The rotating motor 40 and blade 40A chop the particulate material and mix the material with any liquid in the pit. The rotation of rotor 39 also moves the material through one of the pipes 31 or 32 according to the positions of valves 104 and 128. The material is initially moved through agitator pipe 32 to agitate and mix the material in the pit into a relatively smooth slurry.

The agitation of the material is aided by movement of discharge stream 111 about the pit. This insures that all of the material is mixed and can be readily pumped from the pit.

When the material has been mixed, valve 104 is opened and valve 128 is closed. The material will then move up through the fill pipe 31 and out pipe 97 into the tank spreader 27. Fill pipe 31 is strengthened by rails 62 and 63 which are riding on rollers 64A–64D. The fill pipe and support structure can be moved without substantial deflection or binding. The fill pipe and impeller can be readily moved on this structure by lifting and lowering mechanism 69.

While there has been shown and described a preferred embodiment of the invention, it is understood that various changes in structure, materials, and parts can be made by those skilled in the art without departing from the invention.

The embodiments of the invention in which an exclusive property or privilege is claimed are defined as follows:

1. A pump apparatus for moving material, as liquid manure, comprising: a housing having an inlet opening, first means connected to the housing having a first material discharge passage, second means connected to the housing having a second material discharge passage, first valve means for selectively stopping and permitting the flow of material through the first passage, second valve means for selectively stopping and permitting the flow of material through the second passage, means cooperating with the housing for moving material from the inlet through the housing and into the first passage and second passage, and control means operably connected to the first valve means and second valve means for operating said first and second valve means whereby both the first and second valve means cannot be in flow stopping positions at the same time.

2. The apparatus of claim 1 wherein: the first means is an elongated tubular member having an inlet end connected to the housing, said first valve means including a movable gate operable to close the tubular member.

3. The apparatus of claim 1 wherein: the second means is a tubular member having a laterally directed discharge section, said second valve means comprising a movable gate operable to close the tubular member.

4. The apparatus of claim 1 wherein: the first means is an elongated tubular member having an inlet end and an outlet end, said first valve means being mounted on an outlet end section of the tubular member and including a first movable gate, said control means including a first actuator having a first member connected to the first gate and second member, and a second actuator for operating the second valve means, said second member of the first actuator engageable with the second actuator when the first valve is open to prevent movement of the first actuator to close the first gate of the first valve means.

5. The apparatus of claim 4 wherein: the second valve means has a second movable gate, said second actuator being a rod secured to the second gate, said second member engaging said rod when the first valve means is open and the second valve means is closed to prevent the first valve means from being actuated to the flow stopping position.

6. The apparatus of claim 5 wherein: the rod has a hole accommodating the second member when the first valve means is closed, said second member in the hole holding the second valve means in the open position.

7. The apparatus of claim 1 wherein: the first valve means has a first gate movable to open and closed positions, said second valve means has a gate movable to open and closed positions, said control means including a first actuator connected to the first gate operable to move the first gate, and a second actuator connected to the second gate operable to move the second gate, said first actuator having means engageable with the second actuator to hold the second actuator in a position wherein the second gate is in the open position when the first gate is in the closed position.

8. The apparatus of claim 7 wherein: the second actuator is a movable member having a hole, said first actuator having a portion extended through said hole when the second gate is in the open position and the first gate is in the closed position.

9. The apparatus of claim 7 wherein: the first actuator has an elongated leg, said second actuator has a rod, said rod having a transverse hole accommodating the leg when the second gate is in the open position and the first gate is in the closed position.

10. The apparatus of claim 9 wherein: the leg is normally located relative to the rod.

11. The apparatus of claim 1 including: means to movably support the first means, said first means comprising a tubular member, elongated V-shaped rails secured to the tubular member, said means to support the first means including rollers with V-shaped grooves engageable with the V-shaped rails, and winch means operable to move the first means relative to said rollers.

12. The apparatus of claim 11 wherein: the means to movably support the first means includes spaced plate members, said winch means having means rotatably mounting the winch means on the plate members and locating the winch means between said plate members.

13. The apparatus of claim 12 wherein: the winch means includes a drum rotatably mounted on the plate members and cable means wrapped around the drum, said cable means having a first end secured to one end of the first means and a second end secured to the housing whereby operation of the winch means will selectively and positively move the first means in opposite directions.

14. The apparatus of claim 11 wherein: the V-shaped rails are angle members having flanges secured to the sides of the tubular member, said angle members extended longitudinally along the tubular member and on diametrically opposite sides of the tubular member.

15. The apparatus of claim 14 wherein: a plurality of rollers engage each angle member.

16. A pump apparatus for moving material from a pit comprising: an impeller having a housing and rotating member located in the housing for moving material from the impeller, a first outlet pipe secured to the housing, means for driving the rotating member to move material from the impeller to the outlet pipe, transport means for movably supporting said pipe and impeller, said transport means including a wheel and axle assembly, a pair of generally triangular plates mounted on said wheel and axle assembly, rollers rotatably mounted on said plates, said pipe having elongated rails secured to opposite portions of the pipe, said rollers engageable with said rails to guide the movement of the pipe and impeller, winch means rotatably mounted on the plates for moving the pipe and impeller relative to the plates, said winch means including a drum, and cable means wound about said drum, said cable means having a first end attached to the upper end of the pipe and a second end attached to said impeller whereby rotation of said drum moves the pipe relative to the rollers.

17. The apparatus of claim 16 wherein: the rails on the outlet pipe comprise elongated generally V-shaped rails, said rollers having V-grooves engageable with said V-shaped rails.

18. The apparatus of claim 17 wherein: the V-shaped rails are angle members having flanges secured to the sides of the outlet pipe, said angle members extended longitudinally along the outlet pipe and on diametrically opposite sides of the outlet pipe.

19. The apparatus of claim 18 wherein: a plurality of rollers engage each angle member.

20. The pump apparatus of claim 16 including: a second discharge pipe secured to said impeller, a first valve mounted on the first pipe for controlling the flow of material through the first pipe and a second valve associated with the second outlet pipe to control the flow of material through the second pipe, and control means operably connected to the first valve and second valve for operating said valve means whereby both of said valves cannot be simultaneously in closed positions.

21. The apparatus of claim 20 wherein: the control means includes a first actuator having a first member connected to the first valve and a second member, and a second actuator for operating the second valve, said second member of the first actuator engageable with the second actuator when the first valve is open to prevent movement of the first actuator to close the first valve.

22. The apparatus of claim 20 wherein: the second valve has a movable gate, said second actuator being a rod secured to said gate, the second member engaging said rod when the first valve means is open and the second valve means is closed to prevent movement of the first valve to the closed position.

23. The apparatus of claim 22 wherein: the rod has a hole accommodating the second member when the first valve is closed and holding the second valve in the open position.

* * * * *